United States Patent
Li et al.

(10) Patent No.: US 9,890,922 B2
(45) Date of Patent: Feb. 13, 2018

(54) LIGHT EMITTING DEVICE AND BACKLIGHT SOURCE

(71) Applicant: Hisense Electric Co., Ltd., Qingdao (CN)

(72) Inventors: Xiaoping Li, Qingdao (CN); Qiang Zhong, Qingdao (CN); Mingsheng Qiao, Qingdao (CN)

(73) Assignees: HISENSE ELECTRIC CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 314 days.

(21) Appl. No.: 14/707,258

(22) Filed: May 8, 2015

(65) Prior Publication Data

US 2016/0102816 A1   Apr. 14, 2016

(30) Foreign Application Priority Data

Oct. 13, 2014  (CN) .......................... 2014 1 0538754

(51) Int. Cl.
*G09F 13/04*     (2006.01)
*F21V 5/04*      (2006.01)
(Continued)

(52) U.S. Cl.
CPC ............ *F21V 5/04* (2013.01); *G02B 19/0052* (2013.01); *G02F 2001/133607* (2013.01)

(58) Field of Classification Search
CPC ............ G02B 19/0052; G02B 19/0061; G02F 2001/133607; F21V 5/04; F21V 5/06;
(Continued)

(56) References Cited

U.S. PATENT DOCUMENTS 8,425,088 B2 *   4/2013   Matsuki .................. H01L 33/58
                                                 362/244
8,434,911 B2 *   5/2013   Matsuki .................. H01L 33/58
                                                 362/244
(Continued)

FOREIGN PATENT DOCUMENTS

CN          102369390 A       3/2012
CN          202303188 U       7/2012
(Continued)

*Primary Examiner* — Thien M Le
*Assistant Examiner* — April Taylor
(74) *Attorney, Agent, or Firm* — Harness, Dickey & Pierce, P.L.C.

(57) ABSTRACT

The light emitting device includes a light emitting diode and an optical lens, the optical lens includes a light incidence surface and a light exit surface, the light incidence surface includes a first light incidence surface and a second light incidence surface, herein the ratios of the minimum ones to the maximum ones of the distances between respective points, on the first light incidence surface or the second light incidence surface, and the center of the light emission surface respectively belongs to [0.5, 0.7] or [0.683, 0.695]; and the convex surface includes a first light exit surface and a second light exit surface, herein the ratios of the minimum ones to the maximum ones of the distances between respective points, on the first light exit surface or the second light exit surface, and the center of the light emission surface respectively belongs to [0.771, 0.913], or [0.883, 0.921].

20 Claims, 7 Drawing Sheets

(51) Int. Cl.
*G02B 19/00* (2006.01)
*G02F 1/1335* (2006.01)

(58) Field of Classification Search
CPC ..... F21K 9/00; F21K 9/69; F21K 9/60; F21K 9/61; F21K 9/64; F21K 9/65; F21K 9/66; F21K 9/68; F21K 99/00; F21K 9/20; F21K 9/23; F21K 9/232; F21K 9/233; F21K 9/235; F21K 9/237; F21K 9/238
See application file for complete search history.

(56) References Cited

U.S. PATENT DOCUMENTS

| | | | | |
|---|---|---|---|---|
| 8,926,142 | B2* | 1/2015 | Chen | F21V 5/04 362/311.02 |
| 8,967,833 | B2* | 3/2015 | Wang | F21V 5/04 359/708 |
| 9,065,026 | B2* | 6/2015 | Chinniah | F21V 29/713 |
| 2012/0268950 | A1 | 10/2012 | Parkyn et al. | |

FOREIGN PATENT DOCUMENTS

| | | |
|---|---|---|
| CN | 103322504 A | 9/2013 |
| WO | WO-2011024641 A1 | 3/2011 |

\* cited by examiner

Fig.13

LIGHT EMITTING DEVICE AND BACKLIGHT SOURCE

CROSS-REFERENCE TO RELATED APPLICATION

This application claims the benefit and priority of Chinese Patent Application No. 201410538754.2 filed Oct. 13, 2014. The entire disclosure of the above application is incorporated herein by reference.

FIELD

The present disclosure relates to the field of displays and particularly to a light emitting device and a backlight source.

BACKGROUND

This section provides background information related to the present disclosure which is not necessarily prior art.

Liquid Crystal Displays (LCDs) have been widely applied to handsets, computers, televisions and other electronic products with a display function. As well known, the liquid crystal display can display only if it is provided with a backlight source. A Light Emitting Diode (LED) has become a predominant light source acting as the backlight source of the liquid crystal display, due to its small volume, low power consumption, long lifetime, wide color gamut and other characteristics.

SUMMARY

This section provides a general summary of the disclosure, and is not a comprehensive disclosure of its full scope or all of its features.

Some embodiments of the present disclosure provide a light emitting device including a light emitting diode and an optical lens, herein the light emitting diode includes a light emission surface, and the optical lens is a rotation symmetry, disposed above the light emitting diode, and the optical lens includes a light incidence surface and a light exit surface, and the light incidence surface includes a concave surface, and the light exit surface includes a convex surface; and in the condition that a symmetry axis of the optical lens passes a center of the light emission surface of the light emitting diode, the concave surface includes a first light incidence surface and a second light incidence surface adjoining the first light incidence surface, herein the first light incidence surface passes the symmetry axis of the optical lens, and a ratio of the minimum one to the maximum one of distances between respective points on the first light incidence surface and the center of the light emission surface belongs to an closed interval ranging from 0.5 to 0.7; and a ratio of the minimum one to the maximum one of distances between respective points on the second light incidence surface and the center of the light emission surface belongs to an closed interval ranging from 0.683 to 0.695; and the convex surface includes a first light exit surface and a second light exit surface adjoining with the first light exit surface, herein the first light exit surface passes the symmetry axis of the optical lens, and a ratio of the minimum one to the maximum one of distances between respective points on the first light exit surface and the center of the light emission surface belongs to an closed interval ranging from 0.771 to 0.913; and a ratio of the minimum one to the maximum one of distances between respective points on the second light exit surface and the center of the light emission surface belongs to an closed interval ranging from 0.883 to 0.921.

Some embodiments of the present disclosure provide a backlight source, the backlight source includes a light emitting device, which includes a light emitting diode and an optical lens, wherein the light emitting diode includes a light emission surface, and the optical lens being a rotation symmetry disposed above the light emitting diode, and the optical lens includes a light incidence surface and a light exit surface, wherein the light incidence surface includes a concave surface, and the light exit surface includes a convex surface; and in the condition that a symmetry axis of the optical lens passes a center of the light emission surface of the light emitting diode, the concave surface includes a first light incidence surface and a second light incidence surface adjoining the first light incidence surface, wherein the first light incidence surface passes the symmetry axis of the optical lens, and a ratio of the minimum one to the maximum one of distances between respective points on the first light incidence surface and the center of the light emission surface belongs to an closed interval ranging from 0.5 to 0.7; and a ratio of the minimum one to the maximum one of distances between respective points on the second light incidence surface and the center of the light emission surface belongs to an closed interval ranging from 0.683 to 0.695; and the convex surface includes a first light exit surface and a second light exit surface adjoining with the first light exit surface, where the first light exit surface passes the symmetry axis of the optical lens, and a ratio of the minimum one to the maximum one of distances between respective points on the first light exit surface and the center of the light emission surface belongs to an closed interval ranging from 0.771 to 0.913; and a ratio of the minimum one to the maximum one of distances between respective points on the second light exit surface and the center of the light emission surface belongs to an closed interval ranging from 0.883 to 0.921.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

REFERENCE NUMERALS

10—light emitting diode; 100—light emitting device; 101—light emission surface; 11—symmetry axis; 20—substrate; 30—optical lens; 31—light incidence surface; 31a—first light incidence surface; 31b—second light incidence surface; 32—light exit surface; 32a—first light exit surface; 32b—second light exit surface; 32c—third light exit surface; 322—linear surface; 323—inclined surface; 33—bottom surface; 330—support; 34—reflection sheet; 41—first angle; 42—second angle; 43—third angle; 44—fourth angle; 51—first distance; 52—second distance; 53—third distance; and 54—fourth distance.

It shall be noted that in embodiments of the present disclosure, a light incidence surface of an optical lens is a surface at which light enters to the optical lens, and alike a light exit surface is a surface at which light exits the optical lens.

The backlight source formed from light emitting diodes may suffer from non-uniformity in display brightness and other problems, due to a small light emission angle, poor uniformity and other inherent drawbacks of the light emitting diodes.

Figure 1:
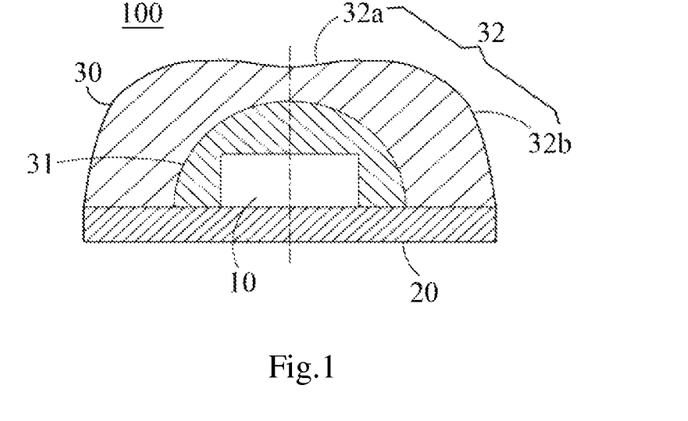
FIG. 1 illustrates a schematic structural diagram of a light emitting device.

In order to address the inherent drawbacks of small light emission angle and poor uniformity of the light emitting diode, typically an optical lens is added to the light emitting diode, to thereby increase the light emission angle of the light emitting diode and achieve uniform light emission. As illustrated in FIG. 1, a light emitting device 100 is illustrated, which includes a light emitting diode 10, a substrate 20 and an optical lens 30, herein the optical lens 30 includes a light incidence surface 31 and a light exit surface 32 of a hemispherical groove, and the light emitting diode 10 is located in the hemispherical groove of the optical lens 30, and the light exit surface 32 of the optical lens 30 includes a first light exit surface 32a and a second light exit surface 32b. Although the light emission angle and uniformity of the light emitting diode is improved by the optical lens in the light emitting device structured as such, light emitted by the light emitting diode may be deflected by the optical lens, thus resulting in excessive brightness in zones proximate to the axis, and if this light emitting device is applied to a backlight source, then bright dots tend to occur on a display screen; and moreover, the ratio of an exit angle to an incidence angle of the light emitting device will become higher at the larger incidence angle, and when the incidence angle is larger than the angle at half power, the incidence angle will be equal to the exit angle, thus easily resulting in bright rings.

Figure 2:
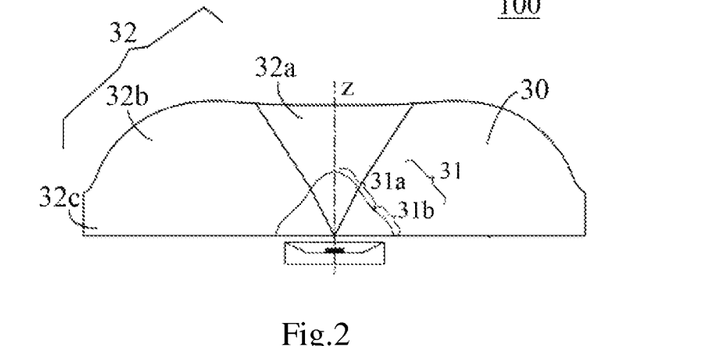
FIG. 2 illustrates a schematic structural diagram of another light emitting device.
Figure 3:
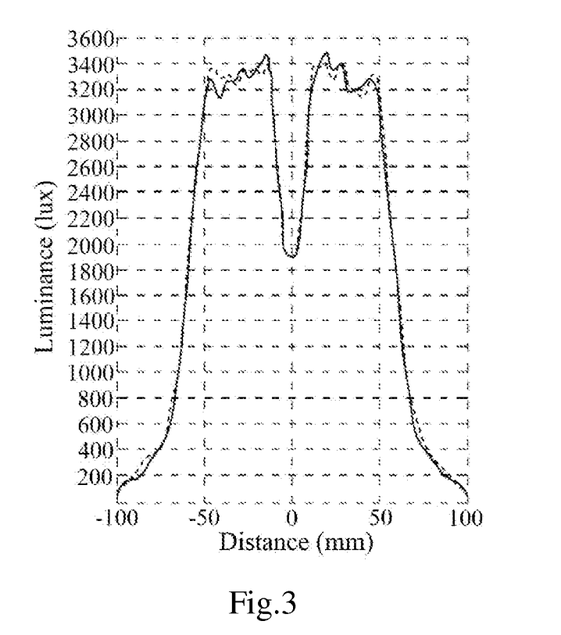
FIG. 3 illustrates an luminance curve graph of the light emitting device in FIG. 2.
Figure 4:
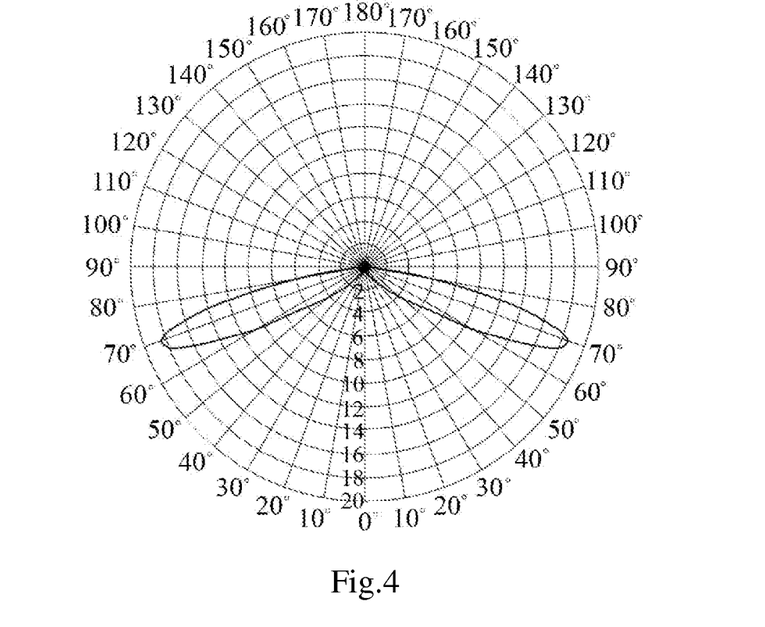
FIG. 4 illustrates a light intensity distribution graph of the light emitting device in FIG. 2.

As illustrated in FIG. 2, there is illustrated another light emitting device 100, and the light incidence surface 31 of the optical lens 30 of the light emitting device 100 includes the first light incidence surface 31a and the second light incidence surface 31b, and the light exit surface 32 of the optical lens 30 includes a first light exit surface 32a, a second light exit surface 32b and a third light exit surface 32c. The optical lens has the light incidence surface and the light exit surface designed in segments respectively, to thereby achieve uniform light to some extent, but as illustrated in FIG. 3 which is an luminance curve graph of the light emitting device, the value of luminance significantly fluctuates in the interval of approximately 10 mm to 50 mm and dramatically drops in the interval of more than 50 mm, thus inevitably resulting in annular strips with non-uniform brightness on the display screen; and as illustrated in FIG. 4 which is a light intensity distribution graph in polar coordinates of the light emitting device, apparently the light exit angle thereof is only 140 degrees, which suggests a small light diffusion range.

Figure 5:
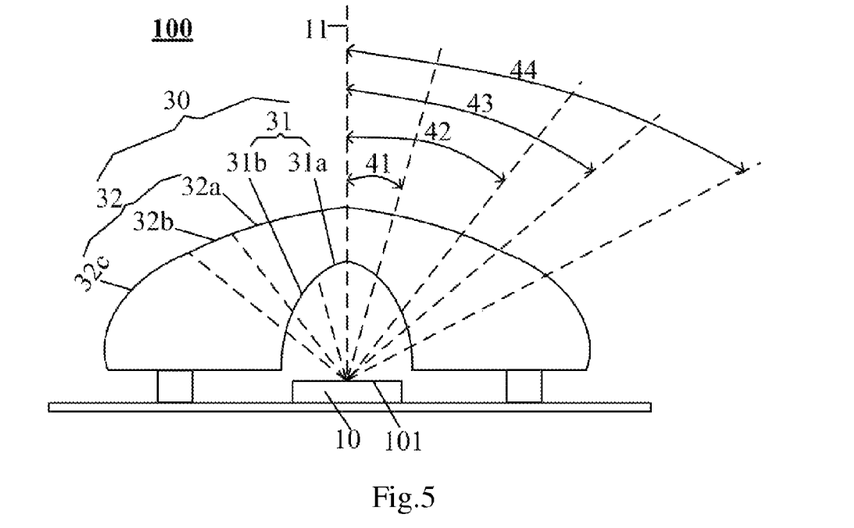
FIG. 5 illustrates a schematic structural diagram of a light emitting device according to an embodiment of the present disclosure.

An embodiment of the present disclosure provides a light emitting device 100, as illustrated in FIG. 5, a light emitting device 100 may include a light emitting diode 10 and an optical lens 30, herein the light emitting diode 10 may include a light emission surface 101, and the optical lens 30 is a rotation symmetry, the optical lens 30 may be disposed above the light emitting diode 10, and the optical lens 30 includes a light incidence surface 31 and a light exit surface 32, the light incidence surface 31 includes a concave surface, and is the light exit surface 32 includes a convex surface.

As illustrated in FIG. 5, in the condition that a symmetry axis 11 of the optical lens 30 passes the center of the light emission surface 101 of the light emitting diode 10, the concave surface includes a first light incidence surface 31a and a second light incidence surface 32b adjoining the first light incidence surface 31a, herein the first light incidence surface 31a passes the symmetry axis 11 of the optical lens 30, and the ratio of the minimum one to the maximum one of the distances between respective points on the first light incidence surface 31a and the center of the light emission surface 101 belongs to an closed interval [0.5, 0.7]; and the ratio of the minimum one to the maximum one of the distances between respective points on the second light incidence surface 31b and the center of the light emission surface 101 belongs to an closed interval [0.683, 0.695]; and As illustrated in FIG. 5, the convex surface includes a first light exit surface 32a and a second light exit surface 32b adjoining with the first light exit surface 32a, herein the first light exit surface 32a passes the symmetry axis 11 of the optical lens 30, and the ratio of the minimum one to the maximum one of the distances between respective points on the first light exit surface 32a and the center of the light emission surface 101 belongs to an closed interval [0.771, 0.913]; and the ratio of the minimum one to the maximum one of the distances between respective points on the second light exit surface 32b and the center of the light emission surface 101 belongs to an closed interval [0.883, 0.921].

As illustrated in FIG. 5, there are a first angle 41 no larger than 30° between a line, connecting any point on the first light incidence surface 31a with the center of the light emission surface 101, and the symmetry axis 11 of the optical lens 30; a fifth angle (not illustrated) no larger than 90° between a line, connecting any point on the second light incidence surface 31b with the center of the light emission surface 101, and the symmetry axis 11 of the optical lens 30; a second angle 42 no larger than 42° between a line, connecting any point on the first light exit surface 32a with the center of the light emission surface 101, and the symmetry axis 11 of the optical lens 30; and a third angle 43 no larger than 51° between a line, connecting any point on the second light exit surface 32b with the center of the light emission surface 101, and the symmetry axis 11 of the optical lens 30.

In the light emitting device above, the optical lens with the symmetry axis coinciding with the optical axis is formed as a result of rotating, by one round, a section through the symmetry axis, and the optical lens formed as such is a rotation symmetry; and the optical lens is disposed above the light emitting diode, to control the direction of light emitted by the light emission surface of the light emitting diode, and the optical lens 30 may be disposed above the light emission surface 101 of the light emitting diode 10, for example as illustrated in FIG. 5; or the light emitting diode 10 may be disposed in the optical lens 30 as illustrated in FIG. 1, etc. The optical lens disposed above the light emission surface of the light emitting diode will be described as an example in an embodiment of the present disclosure with reference to the drawings.

It shall be noted that in some embodiments of the present disclosure, the optical incidence surface includes a concave surface, that is, with respect to the optical lens, the surface of a concave part of the optical lens is an optical incidence surface which may be a concave surface; and the optical exit surface includes a convex surface, that is, with respect to the optical lens, the surface of a convex part of the optical lens is an optical exit surface which can be a convex surface.

It shall be further noted that an embodiment of the present disclosure will not be limited with respect to whether the symmetry axis of the optical lens passes the center of the light emission surface of the light emitting diode, that is, the symmetry axis of the optical lens may or may not pass the center of the light emission surface of the light emitting diode, as long as the center of the light emission surface of the light emitting diode lies on the symmetry axis of the optical lens, and the optical lens satisfies the conditions above of the light incidence surface and the light exit surface. The optical lens with the symmetry axis passing the center of the light exit surface of the light emitting diode will be described only as an example in some embodiments of the present disclosure.

It shall be still further noted that the first angle between the line, connecting the center of the light emission surface with any point on the light incidence surface, and the symmetry axis may be a sharp angle, a right angle or an obtuse angle. The first angle may be a sharp angle in some embodiments of the present disclosure. Alike the second angle and the third angle may also be sharp angles.

Moreover, the first angle may be no larger than 30°; and the fifth angle (not illustrated) may be no larger than 90° between the line, connecting any point on the second light incidence surface with the center of the light emission surface, and the symmetry axis of the optical lens. Since the first light incidence surface and the second light incidence surface adjoin on the light incidence surface, the first angle and the fifth angle may be consecutive, for example, if the first angle is a° (a≤30), then the range of the value of the fifth angle may be (a°, 90°]; and the second angle may be no larger than 42°, and the third angle may be no larger than 51°. Since the first light incidence surface adjoins the second light incidence surface, the second angle and the third angle may be consecutive, for example, if the second angle is b° (b≤42), then the range of the value of the fifth angle may be (b°, 51°]. If the largest value of the second angle is 42°, then the range of the value of the third angle may be (42°, 51°]; and if the largest value of the second angle is 32°, then the range of the value of the third angle may be (32°, 51°].

An embodiment of the present disclosure provides a light emitting device, herein the incidence surface of the optical lens is disposed as the concave surface, and the concave surface is divided into the first light incidence surface and the second light incidence surface dependent, upon the different ratios of the minimum ones to the maximum ones of the distances between the respective points on the light incidence surfaces and the center of the light emission surface, the curvature of the first light incidence surface decrements rapidly, and the curvature of the second light incidence surface decrements slowly, so that light in zones proximate to the axis passing the first light incidence surface is deflected at a larger angle, and light in zones away from the axis passing the second light incidence surface is deflected at a smaller angle, thereby spreading the light in the zones proximate to the axis and distributing uniformly the light in the zones away from the axis, so as to make the light distributed substantially uniform in intensity; besides the exit surface of the optical lens is disposed as the convex surface divided into at least the first light exit surface and the second light exit surface, dependent upon the different ratios of the minimum ones to the maximum ones of the distances between the respective points on the light exit surfaces and the center of the light emission surface, so that the curvature of the first light exit surface decrements rapidly, and the curvature of the second light exit surface decrements slowly, and light in zones proximate to the axis passing the first light exit surface is deflected at a larger angle, and light in zones away from the axis passing the second light exit surface is deflected at a smaller angle, thereby further spreading the light in the zones proximate to the axis, and distributing more uniformly the light in the zones off the axis in a larger range in which the light is scattered, after the light passes the first light exit surface and the second light exit surface, so as to make the light distributed substantially uniform in intensity at a larger light exit angle, thus solving the problems of a small light exit angle of a light emitting device, and bright dots, bright rings and other non-uniformity in brightness occurring on a display screen with a backlight source to which the light emitting device is applied.

Moreover in order to further enlarge the range in which the light is scattered, as illustrated in FIG. 5, the convex surface may include a third light exit surface 32c adjoining the second light exit surface 32b, herein there is a fourth angle 44 between a line, connecting any point on the third light exit surface 32c with the center of the light emission surface 101, and the symmetry axis 11 of the optical lens 30, and the curvature of the third light exit surface 32c may be larger at the larger fourth angle 44, and the fourth angle 44 may be no larger than 90°. It shall be noted that the third angle and the fourth angle may be consecutive like the second angle and the third angle above, and for example, if the largest value of the third angle is 51°, then the range of the value of the fourth angle may be (51°, 90°].

Optionally, the concave surface and/or the convex surface may be a quadratic curved surface or a polynomial surface, to thereby facilitate machining of the optical lens, that is, the concave surface can be a quadratic curved surface or a polynomial surface, and/or, the convex surface may be a quadratic curved surface or a polynomial surface.

The quadratic curved surface can be expressed in Equation (1) of:

$$z = \frac{cr^2}{1 + \sqrt{1 - (1+k)c^2 r^2}} \text{ with } r^2 = x^2 + y^2 \quad (1)$$

herein z represents the distance, in the direction of the optical axis, between any point on the optical plane of the optical lens and the tangential plane at the center of the optical lens; k represents the constant of a quadratic curved surface, to indicate a surface type characteristic of the quadratic curved surface, for example, the equation with k being 0 represents a spherical surface, the equation with k being any value in (−1, 0) represents an ellipsoidal surface, the equation with k being −1 represents a parabolic surface, the equation with k being any value in (−∞ to −1) represents a hyperboloid, etc.; c represents the curvature at the acme of the quadratic curved surface; and r represents the distance between any point on the optical plane of the optical lens and the optical axis in the direction perpendicular to the optical axis.

The polynomial surface can be expressed in Equation (2) of:

$$z = \frac{cr^2}{1 + \sqrt{1 - (1+k)c^2 r^2}} + \sum_{i=2}^{n} C_i r^i \quad (2)$$

herein z represents the distance, in the direction of the optical axis, between any point on the optical plane of the optical lens and the tangential plane at the center of the optical lens; k represents the constant of a quadratic curved surface to indicate a surface type characteristic of the quadratic curved surface, e.g., a spherical surface, an ellipsoidal surface, a parabolic surface, a hyperboloid, etc.; c represents the curvature of the quadratic curved surface; r represents the distance between any point on the optical plane of the optical lens and the optical axis in the direction perpendicular to the optical axis; and $C_i$ represents a revision coefficient.

It shall be noted that, i in the polynomial equation can only take any several even numbers, e.g., i=4, 6 and 8, or any several odd numbers, for example, i=3, 5 and 7, or any several natural numbers, for example, i=3, 4, 5, 6 and 7. With a larger number of values of i, the optical lens can be tuned more finely, nevertheless increasing the processing difficulty of machining of the optical lens. Embodiments of the present disclosure will not be limited in this regard but can be implemented as needed in reality.

It shall be further noted that the respective parameters in Equations (1) and (2) above may be selected as needed in reality as long as the conditions of the light incidence surface and the light exit surface of the optical lens are satisfied, although embodiments of the present disclosure will not be limited in this regard. The light incidence surface may include the first light incidence surface and the second light incidence surface, both of which may be of the same surface type, that is, both of which are formed in the same curved surface equation; and the light exit surface may include the first light exit surface, the second light exit surface and the third light exit surface, herein the first light exit surface and the second light exit surface may be of the same surface type, and the third light exit surface may or may not be the same surface type as the second light exit surface.

Figure 6:
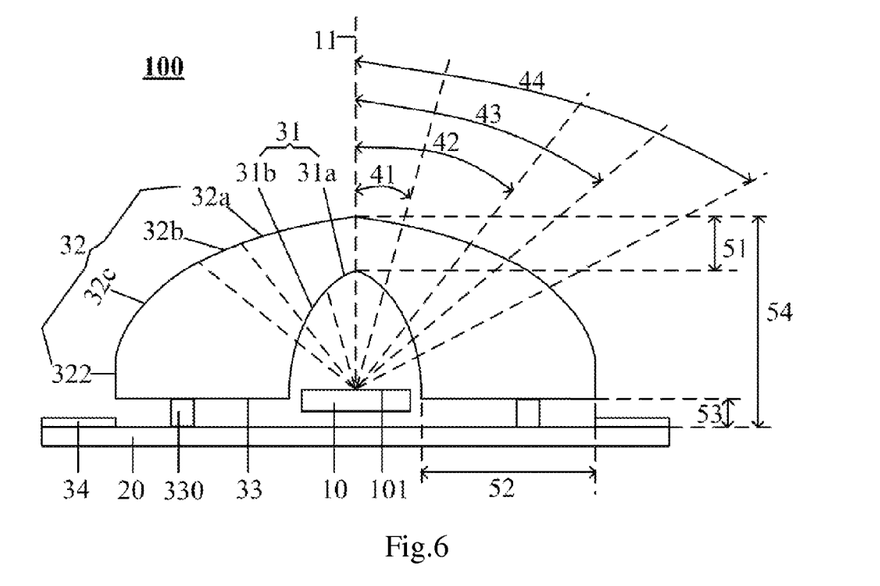
FIG. 6 illustrates a schematic structural diagram of another light emitting device according to an embodiment of the present disclosure.
Figure 7:
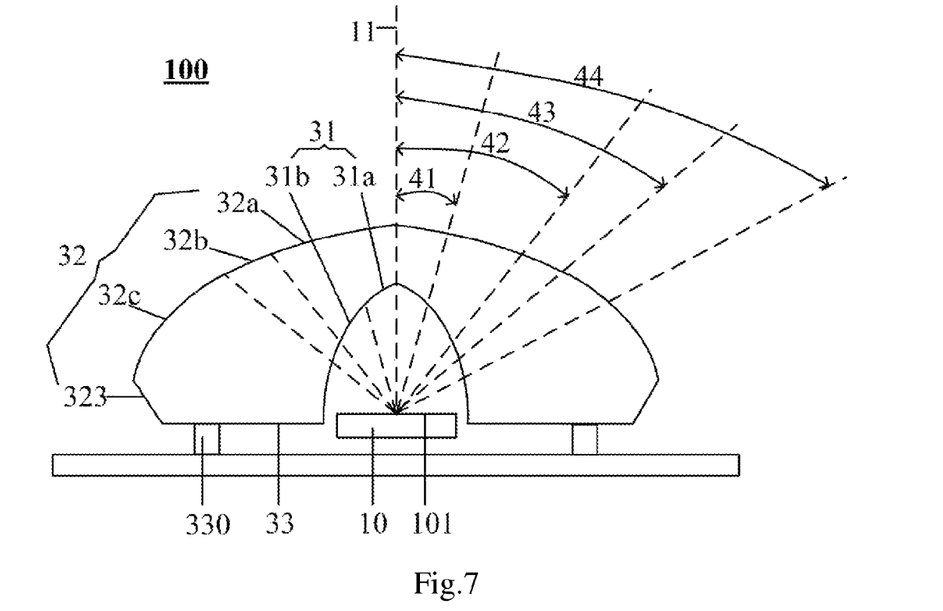
FIG. 7 illustrates a schematic structural diagram of another light emitting device according to an embodiment of the present disclosure.

Optionally as illustrated in FIG. 6 and FIG. 7, the light exit surface 32 may include a linear surface 322, or an inward inclined surface 323, adjoining the third light exit surface 32c.

As illustrated in FIG. 6, the linear surface 322 is formed as result of rotating, by one round, the straight generatrix horizontal to the symmetry axis 11 of the optical lens, to thereby further facilitate fabrication of the optical lens.

As illustrated in FIG. 7, the extending generatrix of the inward inclined surface 323 intersects with the symmetry axis 11 of the optical lens, as a result of rotating the inclined generatrix by one round, and the projection of the inward inclined surface 323 onto the plane, perpendicular to the symmetry axis 11, lies in the projection area of the convex surface on to the plane perpendicular to the symmetry axis 11, that is, the inward inclined surface 323 is inclined toward the inside of the optical lens.

Figure 8:
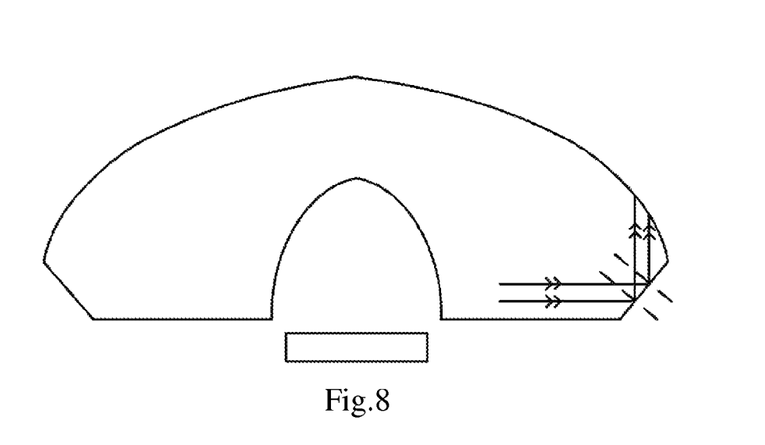
FIG. 8 illustrates a schematic diagram of an optical path of a light ray incident on an inward inclined side at an angle of approximately 90° to a symmetry axis, and then reflected in FIG. 7.

Furthermore, the inward inclined surface is disposed with a reflection sheet. As illustrated in FIG. 8, the inward inclined surface can reflect a light ray at an angle of approximately 90° to the symmetry axis, so that the light ray exits the light exit surface of the light emitting lens, thus making full use of the light ray at the angle of approximately 90° to the symmetry axis, to thereby improve the efficiency of using the light emitting diode.

Optionally in order to ensure the precision in machining of the optical lens and satisfy the minimization requirement thereof, as illustrated in FIG. 6, the distance between the intersection of the light incidence plane 31 with the symmetry axis 11 of the optical lens, and the intersection of the light exit surface 32 with the symmetry axis 11 of the optical lens may be a first distance, and the first distance may be no shorter than 0.5 mm and no longer than 1.5 mm; if the first distance 51 is smaller than 0.5 mm, then machining of the optical lens may be complicated, and if the first distance 51 is larger than 1.5 mm, then the minimization requirement of the optical lens may not be satisfied.

Optionally in order to reduce the cost and improve the efficiency of using the optical lens, as illustrated in FIG. 6, the longest distance between any point on the light exit surface 32 and the symmetry axis 11 of the optical lens may be a second distance 52, and the second distance is no shorter than 6.5 mm and no longer than 8.5 mm.

Optionally as illustrated in FIG. 6, the light emitting device 100 may include the substrate 20 on which the light emitting diode 10 is disposed, and in order to satisfy the thermal dissipation and stability requirements of the light emitting device, the shortest distance between the optical lens and the substrate 20 may be a third distance 53, and the third distance 53 is no shorter than 0.2 mm and no longer than 1 mm.

Further as illustrated in FIG. 6, the substrate 20 can be disposed with a reflection sheet 34 on the side of the substrate 20 where the light emitting diode 10 is attached, herein the reflection sheet 34 can be disposed on the area of the substrate 20 other than the projection area of the optical lens onto the substrate 20, to reflect light incident on the substrate 20 to the outside, to thereby improve the efficiency of using the light emitting diode 10.

Optionally as illustrated in FIG. 6, the light emitting device 100 may include the substrate 20 on which the light emitting diode 10 is attached, and in order to satisfy the requirement on thinning of the light emitting device, the distance between any point on the light exit surface 32 and the substrate 20 may be a fourth distance 54, and the fourth distance 54 is smaller than or equal to 6.5 mm.

It shall be noted that in order to facilitate machining and attachment of the optical lens, as illustrated in FIG. 6 and FIG. 7, the optical lens may include a bottom surface 33 connecting with the light exit surface 32 and the light incidence surface 31, herein the bottom surface 33 can be a frosted surface to facilitate machining thereof. Embodiments of the present disclosure will not be limited in this regard, although the optical lens including the bottom surface will be described below as an example.

Figure 9:
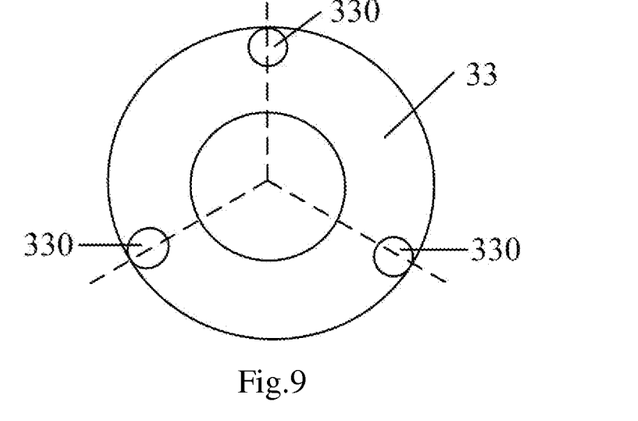
FIG. 9 illustrates a schematic diagram of supports on a bottom surface of a light emitting device according to an embodiment of the present disclosure.

It shall be further noted that as illustrated in FIG. 5 to FIG. 7, the optical lens is disposed above the light emission surface 101 of the light emitting diode 10, and three supports 330 may be disposed on the bottom surface 33 of the optical lens to be distributed uniformly on the bottom surface, to support the optical lens, so that there is some separation space between the optical lens and the light emitting diode 10, to thereby facilitate thermal dissipation of the light emitting diode 10 emitting light for a long period of time, herein the space can be filled with a medium with a smaller refractive index than the optical lens, e.g., air, transparent silicon gel or other material. The light emitting device may include three supports 330 which may be disposed in a circular array as illustrated in FIG. 9. Embodiments of the present disclosure will not be limited to any particular number of supports and arrangement pattern thereof, although they will be described as an example as illustrated in FIG. 9.

The light emitting device according to an embodiment of the present disclosure will be described below by way of an example where the symmetry axis of the optical lens of the light emitting device passes the center of the light emission surface of the light emitting diode.

As illustrated in FIG. 6, the light emitting device 100 may include the substrate 20, and the light emitting diode 10, and the optical lens, disposed on the substrate 20, the substrate 20 may be disposed with the reflection sheet 34 on the side of the substrate 20 on which the light emitting diode 10 is disposed, the light emitting diode 10 may include the light emission surface 101, the optical lens disposed above the light emitting diode 10 is a rotation symmetry, the optical lens may include the light incidence surface 31, the light exit surface 32, and the bottom surface 33 connecting the light incidence surface 31 and the light exit surface 32, the light incidence surface 31 includes the convex surface including the first light incidence surface 31a and the second light incidence surface 31b adjoining the first light incidence surface 31a, the light incidence surface 31 includes the concave surface and the linear surface 322, and the concave surface includes the first light exit surface 32a, the second light exit surface 32b and the third light exit surface 32c, all of which adjoin each other, herein the first light incidence surface 31a is proximate to the symmetry axis 11 of the optical lens 30, the third light exit surface 32c is connected with the second light exit surface 32 and the linear surface 322, and the linear surface 322 is connected with the bottom surface 33.

Figure 10:
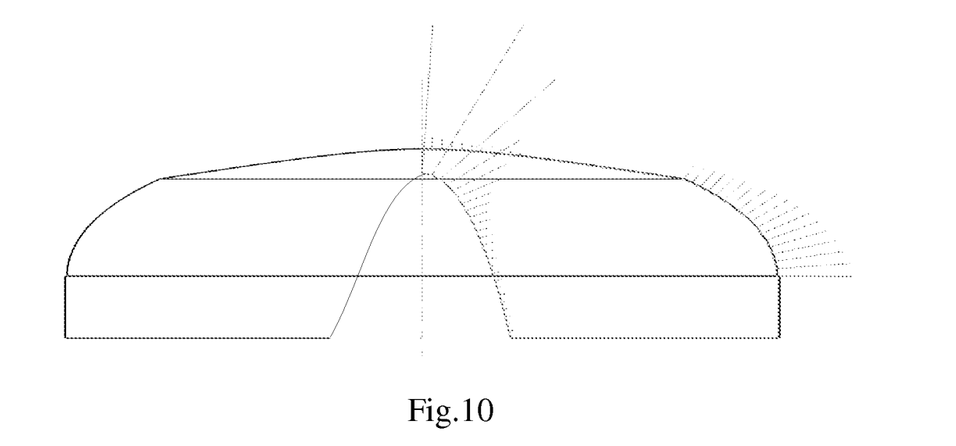
FIG. 10 illustrates a schematic diagram of varying curvatures on a light exit surface and a light incidence surface in FIG. 6.

Referring to FIG. 10, there is the first angle 41 between the line, connecting the center of the light emission surface 101 with any point on the first light incidence surface 31a, and the symmetry axis 11, and the curvature of the first light incidence surface 31a may decrement rapidly at the larger first angle 41; there is a fifth angle (not illustrated) between the line, connecting the center of the light emission surface 101 with any point on the second light incidence surface 31b, and the symmetry axis 11, and the fifth angle may be no larger than 51°. The curvature of the second light incidence surface 31b decrements slowly; there is the second angle 42 between the line, connecting the center of the light emission surface 101 and any point on the first light exit plane 32a, and the symmetry axis 11, and the curvature of the first light exit plane 32a decrements rapidly at the larger second angle 42; there is a third angle 43 between the line, connecting the center of the light emission surface 101 with any point on the second light exit surface 32b, and the symmetry axis 11 of the optical lens, and the third angle 43 may be no larger than 51°, the curvature of the second light exit surface 32b decrements slowly at the larger third angle 43; and there is a fourth angle 44 between the line, connecting the center of the light emission surface 101 with any point on the third light exit surface 32c, and the symmetry axis 11 of the optical lens, and the curvature of the third light exit surface 32c may increment at the larger fourth angle 44, and the fourth angle 44 may be no larger than 90°.

It shall be noted that FIG. 10 merely schematically illustrates a schematic diagram of the varying curvatures on the light exit surface and the light incidence surface, herein a longer line segment represents a larger curvature, and the values of the curvatures of the light exit surface and the light incidence surface are determined as calculated.

As illustrated in FIG. 6, the distance (i.e., the first distance 51) between the intersection of the light incidence surface 31 with the symmetry axis 11 of the optical lens, and the intersection of the light exit surface 32 with the symmetry axis 11 of the optical lens may be 0.70 mm, the longest distance (i.e., the second distance 52) between any point on the light exit surface 32 and the symmetry axis 11 of the optical lens may be 7.80 mm, the shortest distance (i.e., the third distance 53) between the bottom surface 33 and the substrate 20 may be 0.60 mm, and the distance (i.e., the fourth distance 54) between any point on the light exit surface 32 and the substrate 20 may be 5.47 mm.

The bottom surface can be a frosted surface, and the material of the optical lens can be glass or transparent resin, e.g., polymethyl methacrylate, polycarbonate, etc.

As illustrated in FIG. 6, the light incidence surface 31 may be a quadratic curved surface with a curved surface coefficient k of −0.979 and a curvature c of the quadratic curved surface of 0.44; the first light exit surface 31a and the second light exit surface 31b may be quadratic curved surfaces with a curved surface coefficient k of −23.046 and a curvature c of the quadratic curved surface of 9.43; and the third light exit surface 31c may be a polynomial surface with a curved surface coefficient k of 2.532 and a curvature c of the quadratic curved surface of 14.567, herein i=4, 6 and 8 in the polynomial equation with a 4-order revision coefficient of 4.03e−5, a 6-order revision coefficient of −1.557e−8, and an 8-order revision coefficient of −1.908e−8.

Figure 11:
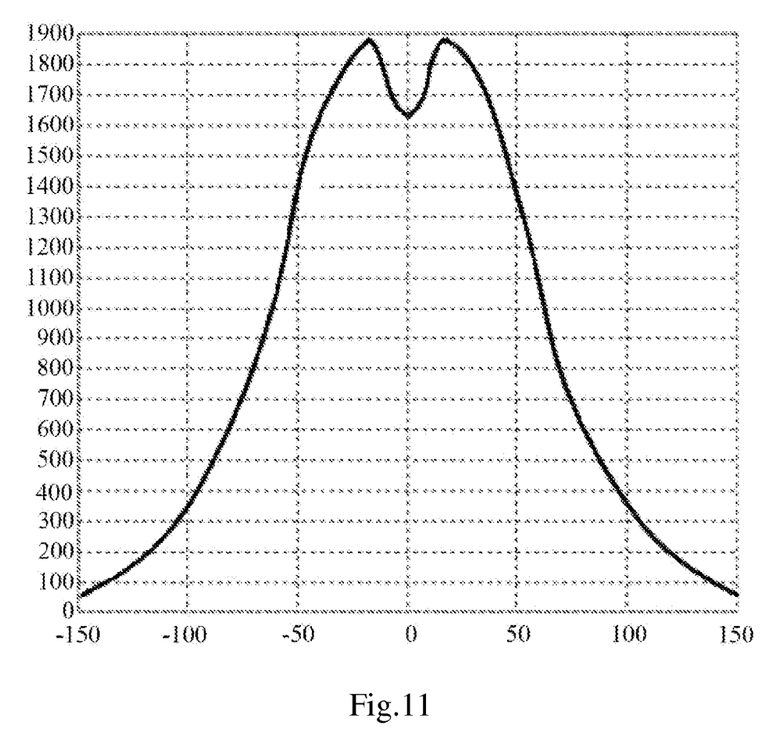
FIG. 11 illustrates a luminance curve graph of illumination on a reception surface, parallel to a reflection surface, at a distance of 25 mm from the reflection surface in the light emitting device in FIG. 6.

Without any scattering or transmission-enhancing film or other optical film sheet/plate, FIG. 11 illustrates a luminance curve graph of illumination on the reception surface, parallel to the reflection surface, at a distance of 25 mm from the reflection surface in the light emitting device, according to the embodiment of the present disclosure, and as compared with the luminance curve graph illustrated in FIG. 3, the luminance curve graph of the light emitting device according to the embodiment of the present disclosure transitions smoothly instead of significantly fluctuating in the interval of luminance values of approximately 10 mm to 50 mm.

Figure 12:
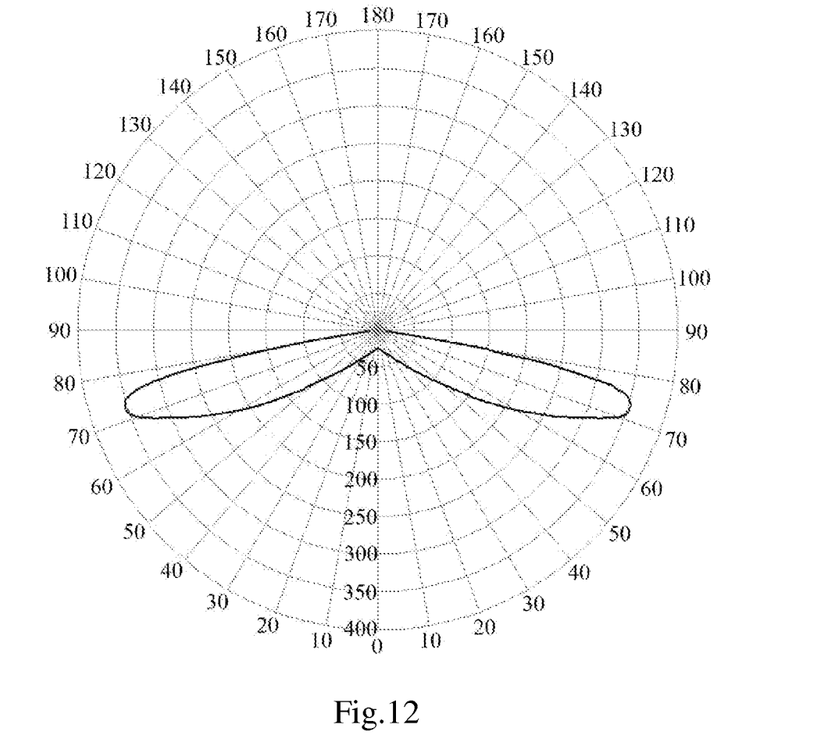
FIG. 12 illustrates a light intensity distribution graph of illumination on the reception surface, parallel to the reflection surface, at the distance of 25 mm from the reflection surface in the light emitting device in FIG. 6.

Given the same conditions, FIG. 12 illustrates a light intensity distribution graph of the light emitting device, in some embodiments of the present disclosure, a peak light intensity distribution angle may be up to 75°, and the light exit angle may be 150° far above the typically light exit angle, e.g., 140° available in FIG. 4.

An embodiment of the present disclosure provides a light emitting device, herein the incidence surface of the optical lens is disposed as the concave surface divided into the first light incidence surface and the second light incidence surface, dependent upon the different ratios of the minimum ones to the maximum ones of the distances between the respective points on the light incidence surfaces and the center of the light emission surface, so that the curvature of the first light incidence surface decrements rapidly, and the curvature of the second light incidence surface decrements slowly, and light in zones proximate to the axis passing the first light incidence surface is deflected at a larger angle, and light in zones away from the axis passing the second light incidence surface is deflected at a smaller angle, thereby spreading the light in the zones proximate to the axis, and distributing uniformly the light in the zones away from the axis, so as to make the light distributed substantially uniform in intensity; and also the exit surface of the optical lens is disposed as the convex surface divided into at least the first light exit surface and the second light exit surface, dependent upon the different ratios of the minimum ones to the maximum ones of the distances between the respective points on the light exit surfaces and the center of the light emission surface, so that the curvature of the first light exit surface decrements rapidly, and the curvature of the second light exit surface decrements slowly, and light in zones proximate to the axis passing the first light exit surface is deflected at a larger angle, and light in zones away from the axis passing the second light exit surface is deflected at a smaller angle, thereby further spreading the light in the zones proximate to the axis, and distributing more uniformly the light in the zones away from the axis in a larger range in which the light is scattered, after the light passes the first light exit surface and the second light exit surface, so as to make the light distributed substantially uniform in intensity at a larger light exit angle, thus improving the problems of a small light exit angle of a light emitting device, and bright dots, bright rings and other non-uniformity in brightness occurring on a display screen with a backlight source to which the light emitting device is applied.

Some embodiments of the present disclosure provide a backlight source, and the backlight source may include any light emitting device above. The backlight source may serve as a light source of a liquid crystal display, or a TV set, a digital camera, a handset, a tablet PC or other products or components including a liquid crystal display.

Figure 13:
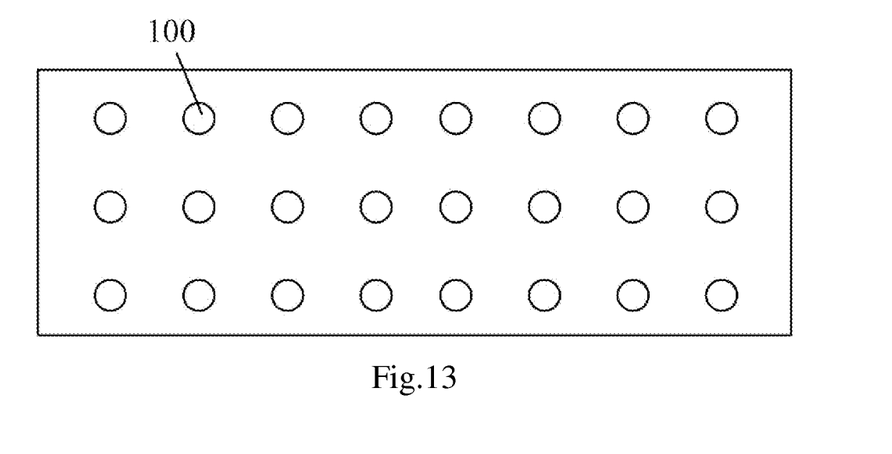
FIG. 13 illustrates a schematic diagram of a backlight source according to an embodiment of the present disclosure.

As illustrated in FIG. 13, in some embodiments of the present disclosure, the backlight source may include a plurality of light emitting devices 100 disposed in a matrix, and an embodiment of the present disclosure will not be limited to any particular number of light emitting devices in the backlight source and arrangement patterns thereof, although the backlight source including the light emitting devices disposed in a matrix will be described as an example.

In some embodiments of the present disclosure, the backlight source may include a light emitting device, which includes a light emitting diode and an optical lens, wherein the light emitting diode includes a light emission surface, and the optical lens being a rotation symmetry disposed above the light emitting diode, and the optical lens includes a light incidence surface and a light exit surface, wherein the light incidence surface includes a concave surface, and the light exit surface includes a convex surface; and in the condition that a symmetry axis of the optical lens passes a center of the light emission surface of the light emitting diode, the concave surface includes a first light incidence surface and a second light incidence surface adjoining the first light incidence surface, wherein the first light incidence surface passes the symmetry axis of the optical lens, and a ratio of the minimum one to the maximum one of distances between respective points on the first light incidence surface and the center of the light emission surface belongs to an closed interval ranging from 0.5 to 0.7; and a ratio of the minimum one to the maximum one of distances between respective points on the second light incidence surface and the center of the light emission surface belongs to an closed interval ranging from 0.683 to 0.695; and the convex surface includes a first light exit surface and a second light exit surface adjoining with the first light exit surface, where the first light exit surface passes the symmetry axis of the optical lens, and a ratio of the minimum one to the maximum one of distances between respective points on the first light exit surface and the center of the light emission surface belongs to an closed interval ranging from 0.771 to 0.913; and a ratio of the minimum one to the maximum one of distances between respective points on the second light exit surface and the center of the light emission surface belongs to an closed interval ranging from 0.883 to 0.921.

In some embodiments, there is a first angle no larger than 30° between a line, connecting any point on the first light incidence surface with the center of the light emission surface, and the symmetry axis of the optical lens.

In some embodiments, there is a fifth angle no larger than 90° between a line, connecting any point on the second light incidence surface with the center of the light emission surface, and the symmetry axis of the optical lens.

In some embodiments, there is a second angle no larger than 42° between a line, connecting any point on the first light exit surface with the center of the light emission surface, and the symmetry axis of the optical lens.

In some embodiments, there is a third angle no larger than 51° between a line, connecting any point on the second light exit surface with the center of the light emission surface, and the symmetry axis of the optical lens.

In some embodiments, the convex surface may include a third light exit surface adjoining the second light exit surface, there is a fourth angle no larger than 90° between a line, connecting any point on the third light exit surface with the center of the light emission surface, and the symmetry axis of the optical lens, and a curvature of the third light exit surface becomes larger at the larger fourth angle.

In some embodiments, the light exit surface may include a linear surface, or an inward inclined surface, adjoining the third light exit surface, a straight generatrix of the linear surface is horizontal to the symmetry axis of the optical lens, and an extending generatrix of the inward inclined surface intersects with the symmetry axis of the optical lens.

In some embodiments, there is a first distance between an intersection of the light incidence plane with the symmetry axis of the optical lens, and an intersection of the light exit surface with the symmetry axis of the optical lens, and the first distance is no shorter than 0.5 mm, and no longer than 1.5 mm.

In some embodiments, there is a second distance being the longest distance between any point on the light exit surface and the symmetry axis of the optical lens, and the second distance is no shorter than 6.5 mm, and no longer than 8.5 mm.

In some embodiments, the light emitting device may include a substrate on which the light emitting diode is disposed, there is a third distance being the shortest distance between the optical lens and the substrate 20, and the third distance is no shorter than 0.2 mm and no longer than 1 mm.

In some embodiments, the light emitting device may include a substrate on which the light emitting diode is attached, and there is a fourth distance no longer than 6.5 mm between any point on the light exit surface and the substrate.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A light emitting device, comprising:
   a light emitting diode; and
   an optical lens, wherein:
   the light emitting diode comprises a light emission surface, the optical lens has rotational symmetry and is disposed above the light emitting diode, the optical lens comprises a light incidence surface and a light exit surface, the light incidence surface comprises a concave surface, and the light exit surface comprises a convex surface;
   a symmetry axis of the optical lens passes a center of the light emission surface of the light emitting diode;
   the concave surface comprises a first light incidence surface and a second light incidence surface adjoining the first light incidence surface, the first light incidence surface passes the symmetry axis of the optical lens, and a ratio of the minimum one to the maximum one of distances between respective points on the first light incidence surface and the center of the light emission surface belongs to a closed interval ranging from 0.5 to 0.7;
   a ratio of the minimum one to the maximum one of distances between respective points on the second light incidence surface and the center of the light emission surface belongs to a closed interval ranging from 0.683 to 0.695;
   the convex surface comprises a first light exit surface and a second light exit surface adjoining with the first light exit surface, the first light exit surface passes the symmetry axis of the optical lens, and a ratio of the minimum one to the maximum one of distances between respective points on the first light exit surface and the center of the light emission surface belongs to a closed interval ranging from 0.771 to 0.913; and
   a ratio of the minimum one to the maximum one of distances between respective points on the second light exit surface and the center of the light emission surface belongs to a closed interval ranging from 0.883 to 0.921.

2. The light emitting device according to claim 1, wherein an angle no larger than 30° is defined between a line connecting any point on the first light incidence surface with the center of the light emission surface, and the symmetry axis of the optical lens.

3. The light emitting device according to claim 1, wherein an angle no larger than 90° is defined between a line connecting any point on the second light incidence surface with the center of the light emission surface, and the symmetry axis of the optical lens.

4. The light emitting device according to claim 1, wherein an angle no larger than 42° is defined between a line connecting any point on the first light exit surface with the center of the light emission surface, and the symmetry axis of the optical lens.

5. The light emitting device according to claim 1, wherein an angle no larger than 51° is defined between a line connecting any point on the second light exit surface with the center of the light emission surface, and the symmetry axis of the optical lens.

6. The light emitting device according to claim 1, wherein the convex surface comprises a third light exit surface adjoining the second light exit surface, an angle no larger than 90° is defined between a line connecting any point on the third light exit surface with the center of the light emission surface, and the symmetry axis of the optical lens, and a curvature of the third light exit surface becomes larger at the angle.

7. The light emitting device according to claim 6, wherein the light exit surface comprises a linear surface or an inward inclined surface, adjoining the third light exit surface, a straight generatrix of the linear surface is horizontal to the symmetry axis of the optical lens, and an extending generatrix of the inward inclined surface intersects with the symmetry axis of the optical lens.

8. The light emitting device according to claim 1, wherein a first distance is defined between an intersection of the light incidence plane with the symmetry axis of the optical lens and an intersection of the light exit surface with the symmetry axis of the optical lens, and the first distance is no shorter than 0.5 mm and no longer than 1.5 mm.

9. The light emitting device according to claim 1, wherein the longest distance between any point on the light exit surface and the symmetry axis of the optical lens is no shorter than 6.5 mm and no longer than 8.5 mm.

10. The light emitting device according to claim 1, wherein the light emitting device comprises a substrate on which the light emitting diode is disposed, and the shortest distance between the optical lens and the substrate is no shorter than 0.2 mm and no longer than 1 mm.

11. The light emitting device according to claim 1, wherein the light emitting device comprises a substrate on which the light emitting diode is attached, and distance no longer than 6.5 mm is defined between any point on the light exit surface and the substrate.

12. A backlight source, comprising:
    a light emitting device including:
    a light emitting diode; and
    an optical lens, wherein:

the light emitting diode comprises a light emission surface, the optical lens has rotational symmetry and is disposed above the light emitting diode, the optical lens comprises a light incidence surface and a light exit surface, the light incidence surface comprises a concave surface, and the light exit surface comprises a convex surface;

a symmetry axis of the optical lens passes a center of the light emission surface of the light emitting diode;

the concave surface comprises a first light incidence surface and a second light incidence surface adjoining the first light incidence surface, the first light incidence surface passes the symmetry axis of the optical lens, and a ratio of the minimum one to the maximum one of distances between respective points on the first light incidence surface and the center of the light emission surface belongs to a closed interval ranging from 0.5 to 0.7;

a ratio of the minimum one to the maximum one of distances between respective points on the second light incidence surface and the center of the light emission surface belongs to a closed interval ranging from 0.683 to 0.695;

the convex surface comprises a first light exit surface and a second light exit surface adjoining with the first light exit surface, the first light exit surface passes the symmetry axis of the optical lens, and a ratio of the minimum one to the maximum one of distances between respective points on the first light exit surface and the center of the light emission surface belongs to a closed interval ranging from 0.771 to 0.913; and a ratio of the minimum one to the maximum one of distances between respective points on the second light exit surface and the center of the light emission surface belongs to a closed interval ranging from 0.883 to 0.921.

13. The backlight source according to claim 12, wherein an angle no larger than 30° is defined between a line connecting any point on the first light incidence surface with the center of the light emission surface, and the symmetry axis of the optical lens.

14. The backlight source according to claim 12, wherein an angle no larger than 90° is defined between a line connecting any point on the second light incidence surface with the center of the light emission surface, and the symmetry axis of the optical lens.

15. The backlight source according to claim 12, wherein an angle no larger than 42° is defined between a line connecting any point on the first light exit surface with the center of the light emission surface, and the symmetry axis of the optical lens.

16. The backlight source according to claim 12, wherein an angle no larger than 51° is defined between a line connecting any point on the second light exit surface with the center of the light emission surface, and the symmetry axis of the optical lens.

17. The backlight source according to claim 12, wherein the convex surface comprises a third light exit surface adjoining the second light exit surface, an angle no larger than 90° is defined between a line, connecting any point on the third light exit surface with the center of the light emission surface, and the symmetry axis of the optical lens, and a curvature of the third light exit surface becomes larger at the angle.

18. The backlight source according to claim 17, wherein the light exit surface comprises a linear surface or an inward inclined surface, adjoining the third light exit surface, a straight generatrix of the linear surface is horizontal to the symmetry axis of the optical lens, and an extending generatrix of the inward inclined surface intersects with the symmetry axis of the optical lens.

19. The backlight source according to claim 12, wherein a first distance is defined between an intersection of the light incidence plane with the symmetry axis of the optical lens and an intersection of the light exit surface with the symmetry axis of the optical lens, and the first distance is no shorter than 0.5 mm and no longer than 1.5 mm.

20. The backlight source according to claim 12, wherein the longest distance between any point on the light exit surface and the symmetry axis of the optical lens is no shorter than 6.5 mm and no longer than 8.5 mm.

* * * * *